(12) United States Patent
Chen et al.

(10) Patent No.: US 11,747,899 B2
(45) Date of Patent: Sep. 5, 2023

(54) GAZE-BASED WINDOW ADJUSTMENTS

(71) Applicant: HEWLETT-PACKARD DEVELOPMENT COMPANY, L.P., Spring, TX (US)

(72) Inventors: Yi-Chen Chen, Taipei (TW); Nick Thamma, Spring, TX (US); King Sui Kei, Spring, TX (US); Chih-Hua Chen, Taipei (TW); Kun-Cheng Tsai, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 21 days.

(21) Appl. No.: 17/534,758

(22) Filed: Nov. 24, 2021

(65) Prior Publication Data

US 2023/0161404 A1 May 25, 2023

(51) Int. Cl.
| | | |
|---|---|---|
| *G06F 3/01* | (2006.01) | |
| *G06F 3/14* | (2006.01) | |
| *G06F 3/04847* | (2022.01) | |
| *G06F 3/16* | (2006.01) | |
| *G06T 7/70* | (2017.01) | |
| *G06F 3/0481* | (2022.01) | |
| *H04L 65/1083* | (2022.01) | |

(52) U.S. Cl.
CPC .............. *G06F 3/013* (2013.01); *G06F 3/012* (2013.01); *G06F 3/0481* (2013.01); *G06F 3/04847* (2013.01); *G06F 3/1423* (2013.01); *G06F 3/165* (2013.01); *G06T 7/70* (2017.01); *G06F 2203/04803* (2013.01); *G06T 2207/20081* (2013.01); *G06T 2207/30201* (2013.01); *H04L 65/1086* (2013.01)

(58) Field of Classification Search
CPC ........ G06F 3/013; G06F 3/012; G06F 3/0481; G06F 3/04847; G06F 3/1423; G06F 3/165; G06F 2203/04803; G06T 7/70; G06T 2207/20081; G06T 2207/30201; H04L 65/1086
See application file for complete search history.

(56) References Cited

U.S. PATENT DOCUMENTS

| | | | |
|---|---|---|---|
| 8,416,715 B2 | 4/2013 | Rosenfeld | |
| 8,571,192 B2 | 10/2013 | Etter | |
| 8,581,958 B2 | 11/2013 | Baker | |
| 11,457,271 B1* | 9/2022 | Faulkner | ................ G11B 27/11 |
| 2011/0074915 A1 | 3/2011 | Ferren | |

(Continued)

*Primary Examiner* — James T Tsai
(74) *Attorney, Agent, or Firm* — Knobbe, Martens, Olson & Bear, LLP

(57) ABSTRACT

In one example in accordance with the disclosure, a computing device is described. An example computing device includes a gaze tracking device. An example gaze tracking device identifies, from a captured image, a gaze region for a user viewing a display device coupled to the example computing device. The gaze region indicates a location on the display device where the user is looking. The example computing device includes a controller. An example controller determines a first window on the display device that is aligned with the gaze region and based on a determination that the first window is aligned with the gaze region, adjusts a video setting of a second window that is outside the gaze region.

19 Claims, 7 Drawing Sheets

(56) References Cited

U.S. PATENT DOCUMENTS

| | | | | |
|---|---|---|---|---|
| 2014/0123030 A1* | 5/2014 | Kozloski | ............... | G06Q 10/10 |
| | | | | 715/753 |
| 2015/0074556 A1 | 3/2015 | Bader-Natal | | |
| 2018/0176713 A1* | 6/2018 | Linsky | ................. | H04W 76/14 |
| 2019/0102905 A1* | 4/2019 | Skogö | ..................... | G06F 3/012 |
| 2019/0339769 A1* | 11/2019 | Cox | ........................ | G06F 3/016 |
| 2020/0326839 A1* | 10/2020 | Walkin | ................. | G06F 3/0482 |
| 2021/0216138 A1* | 7/2021 | Weksler | ............... | G06F 3/0489 |
| 2021/0400142 A1* | 12/2021 | Jorasch | ................ | H04M 3/567 |
| 2022/0182581 A1* | 6/2022 | Oz | ...................... | H04L 65/1093 |

* cited by examiner

GAZE-BASED WINDOW ADJUSTMENTS

BACKGROUND

Computing devices allow interaction between users of different computing devices. For example, via a videoconferencing application, a user at one computing device can engage in video and audio communication with a user at another computing device. Computing devices also have the capability of allowing a user to simultaneously access multiple applications. For example, a first window may present a word processing application while a second window displays a video stream.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
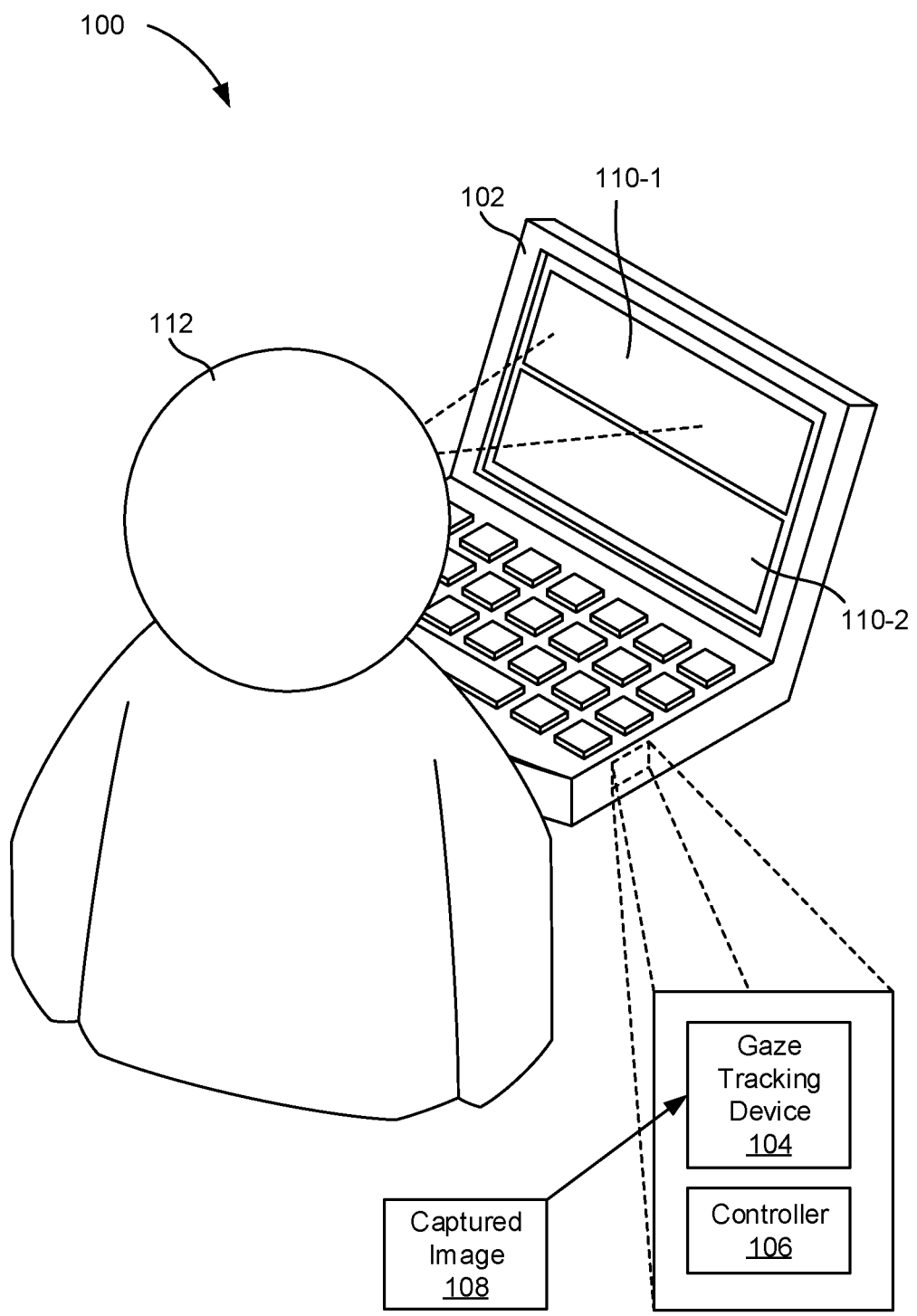
FIG. 1 is a diagram of a computing device for gaze-based window adjustments, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing devices are used by millions of people daily to carry out business, personal, and social operations and it is not uncommon for an individual to interact with multiple computing devices on a daily basis. Examples of computing devices include desktop computers, laptop computers, all-in-one devices, tablets, and gaming systems to name a few. In some cases, a user may simultaneously interact with different applications. For example, a first window may display a word processing application and another window may be display a video stream. In another example, a first window may display a first videoconferencing application and a second window may display a second videoconferencing application. Each of these windows and applications may utilize the same hardware components of the computing device. For example, a first videoconferencing application and a second videoconferencing application may access a camera and microphone of the computing device. However, simultaneous use of the different applications may lead to conflict, confusion, and/or inefficient use of the hardware components of the computing device.

For example, it may be that a video stream triggers a high refresh rate for a display device while a simultaneously executed word processing application does not require a high refresh rate. Accordingly, even when a user is focusing on the word processing application, a high refresh rate for the computing device may be triggered as the video stream is also active. This may result in increased power consumption and inefficient use of hardware resources of the computing device.

In another example, a user may have two videoconferencing applications open. A user may desire to switch from a first videoconference on the first videoconferencing application to a second videoconference on the second videoconferencing application. To do so, the user may need to manually disable the video and audio from the first video conferencing application and manually enable the video and audio for the second video conferencing application.

If video and audio settings are not switched, participants in the second videoconference may hear audio from the first videoconference, which may compromise the security of confidential information shared in the first videoconference. Similarly, if using external speakers, a user displaying both videoconferences may hear audio from both videoconferences, which may be overwhelming, confusing, and may reduce the efficacy of the either videoconference. Still further, allowing each videoconference application to both output and receive audio may lead to audio interference and/or distortion.

Still further, it may be that participants in either video conference will view the user switching their gaze between the videoconferences, which may be distracting and may overwhelm the computing device.

Manually switching the audio and video settings may be complex, time-consuming, and may negatively impact the efficacy of both video conferences. Moreover, manual switching may be prone to user error as a user may inadvertently maintain an audio/video connection to a first application as opposed to switching to a second application as they may have intended to do.

Accordingly, the specification provides a way to switch device settings including display, audio, and privacy settings between multiple applications by tracking the gaze of the user. That is, the application tracks the user's gaze or eye movement between two windows (which may be on different display devices). When the user is looking at a first window, the video of the second window, and in some cases the audio as well, may be adjusted (i.e., video blurred/disabled and audio muted), while the video and audio output from the first application is output. As a particular example, when a user switches focus from a first videoconference which is terminating, to a second videoconference which is just beginning, the video and audio settings may be automatically adjusted when the gaze region of the user switches to a window associated with the second videoconference.

Specifically, the specification describes a computing device. The computing device includes a gaze tracking device. The gaze tracking device identifies, from a captured image, a gaze region for a user viewing a display device coupled to the computing device. The gaze region indicates a location on the display device where the user is looking. The computing device also includes a controller. The controller determines a first window on the display device that is aligned with the gaze region. Based on a determination that the first window is aligned with the gaze region; the controller adjusts a video setting of a second window that is outside the gaze region.

In another example, the computing device includes a gaze tracking device that includes an artificial intelligence (AI) model. In this example, the gaze tracking device identifies, from a captured image of a user viewing a display device coupled to the computing device, a pupil position for the user and from the pupil position of the user, position data for a head of the user. The gaze tracking device identifies from the position data for the head of the user, a gaze region for the user. The computing device also includes a controller which identifies a first window of the display device. The controller determines whether the first window on the display device is aligned with the gaze region for the user. Responsive to a determination that the first window is aligned with the gaze region, the controller adjusts a setting of a second window that is outside the gaze region.

The specification also describes a non-transitory machine-readable storage medium encoded with instructions executable by a processor of a computing device. As used in the specification, the term "non-transitory" does not encompass transitory propagating signals. The instructions when executed by the processor, cause the processor to 1) capture an image of a user viewing a display device coupled to the computing device and 2) identify a gaze region associated with the image. As described above, the gaze region indicates a location on the display device where the user is looking. The instructions are also executable by the processor to cause the processor to 1) identify a first window boundary of the display device, 2) identify a second window boundary of the display device, and 3) compare the gaze region, first window boundary, and second window boundary to identify which of the first window boundary and second window boundary overlaps with the gaze region. The instructions, when executed by the processor, also cause the processor to adjust a setting of a second window, responsive to the first window boundary overlapping with the gaze region.

Turning now to the figures, FIG. 1 is a diagram of a computing device 100 for gaze-based window 110 adjustments, according to an example. The computing device 100 may be of a variety of types including a desktop computer, a laptop computer, a tablet, or any of a variety of other computing devices 100. As described above, at any point in time multiple windows 110-1, 110-2, may be presented on a display device 102 coupled to the computing device 100. The different windows 110 may correspond to different applications that are executing on the computing device 100. As an example, a first window 110-1 may present a first videoconferencing application or session while a second window 110-2 presents a second videoconferencing application or a second session of the first videoconferencing application. At any given time, the user 112 may be focusing on a different one of the windows 110. In the example depicted in FIG. 1, the user 112 is focusing on the first window 110-1 as indicated by the dashed lines. As described above, the computing device 100 can adjust the video and/or audio settings of the different windows 110 based on where the user 112 is focusing, or gazing.

For example, the gaze tracking device 104 may monitor the user's gazing direction. When the user 112 looks to the first window 110-1, the controller 106 may switch the video and audio settings to de-emphasize the video and audio associated with the second window 110-2 while prioritizing the audio and video settings of the first window 110-1. When the user 112 looks to the second window 110-2, the controller 106 may switch the video and audio settings to de-emphasize the first window 110-1 while prioritizing the audio and video settings of the second window 110-2.

Accordingly, the computing device 100 includes different components such as a gaze tracking device 104 and a controller 106. Each of these components, as well as other components such as those depicted in FIGS. 3, 4, and 5 may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement the functionality described herein.

The gaze tracking device 104 may identify, from a captured image 108, a gaze region for a user 112 viewing a display device 102 coupled to the computing device 100. The gaze region indicates a location on the display device 102 where the user 112 is looking.

A computing device 100 may include or be coupled to a capture device such as a camera. The camera may be positioned so as to capture an image of the user's face as they are looking at the display device 102. The captured image 108 or stream of captured images 108 is passed to the gaze tracking device 104 which determines the gaze region of the user 112. The gaze tracking device 104, which may be a machine-learning gaze tracking device 104, analyzes the captured image(s) 108 to determine various characteristics of the user position. For example, from the analysis of the captured image 108, the gaze tracking device 104 may determine a yaw, pitch, and roll angle of the head of the user 112. The gaze tracking device 104 may collect other data such as a distance between the user 112 and the display device 102, a user presence in front of the display device 102, a user focus in the field of view of the capture device, and a user eye state, i.e., whether the user's eyes are open or closed, or a combination thereof. In addition to this information, the gaze tracking device 104 may determine a gaze point for the user 112 in an x-direction, i.e., a horizontal direction and a gaze point for the user 112 in a y-direction, i.e., a vertical direction.

Gaze tracking may occur in a variety of ways. For example, a camera may project a pattern of near-infrared light on the pupils. In this example, the camera may take high-resolution images of the user's 112 eyes and the patterns. The gaze tracking device 104 may then determine the eyes position and gaze region based on the reflected patterns.

In some examples, the gaze tracking device 104 may be calibrated to allow the gaze tracking device 104 to recognize the location of the user's 112 eyes. In such an example, the computing device 100 may prompt the user 112 to make a sequence of eye movements such as a left-to-right movement and a top-to-bottom movement.

In an example, gaze tracking may include applying weights from an artificial intelligence model to the captured image 108. For example, a training set of data may include thousands of images tagged by user viewing direction. In this example, the artificial intelligence model may be trained by viewing direction-tagged images. During training, weightings associated with characteristics of images are adjusted to fit the labeled output for the image. After the training is completed, these weighting factors are fixed for this model. Accordingly, once a captured image 108 is received, the weightings will be applied to the captured image 108 to determine the gaze region of the user 112.

However obtained, the gaze region of the user 112 may be passed to a controller 106 which adjusts the settings of the computing device 100 based on the determined gaze region. Specifically, the controller 106 may identify a first window 110-1 on the display device 102 that is aligned with the identified gaze region. That is, the controller 106 may have access to metadata associated with the windows 110-1, 110-2. The metadata indicates the window size and position. The controller 106 may determine whether the gaze region is aligned with either of these windows 110-1, 110-2 to determine whether the windows 110-1, 110-2 are the subject of focus of the user 112.

As a particular example, a first window 110-1 may have x-y coordinates, indicating the boundary of the first window 110-1. The controller 106 may receive an x-coordinate and y-coordinate for the gaze region of the user 112. Responsive to the x and y coordinates for the gaze region falling within the coordinates of the first window 110-1, the controller 106 may determine that the user 112 is actively focusing on the first window 110-1 and may adjust the settings of the first and/or second window 110 accordingly. As depicted in FIG. 1, the second window 110-2 may be on the display device 102 alongside the first window 110-1. However, in other examples, such as that depicted in FIG. 3, the second window 110-2 may be on a second display device.

Based on a gaze region of the user 112 aligning with the first window 110-1, the controller 106 may adjust a video setting of the second window 110-2 that is outside of the gaze region. For example, responsive to the gaze region of the user 112 aligning with the first window 110-1, the controller 106 may blur a video stream of the user in the second window 110-2. Doing so may prevent a participant of the video conference in the second window 110-2 from viewing the user 112 looking towards the first window 110-1 and not the second window 110-2.

As a second example, the controller 106 may entirely disable a video stream of the user 112 in the second window 110-2 responsive to a determination that the first window 110-1 is aligned with the gaze region. As yet another example, the controller 106 may loop a pre-recorded video of the user 112 in a video stream of the second window 110-2. That is, the controller 106 may pre-record a segment of video of the user 112 gazing in the direction of the second window 110-2 and may loop this pre-recorded video to participants in the videoconference associated with the second window 110-2, such that participants in the videoconference associated with the second window 110-2 do not see the user looking away from the second window 110-2.

In addition to adjusting the video settings of the second window 110-2, the controller 106 may adjust an audio setting of the second window 110-2 that is outside of the gaze region, responsive to a determination that the user is gazing at the first window 110-1. For example, the controller 106 may mute the audio passed to the videoconferencing application associated with the second window 110-2.

In some examples, the controller 106 may make such adjustments after the user 112 has gazed at a particular window 110 for a threshold period of time. That is, a user 112 may look away from the first window 110-1 for a moment, for example to look at the time on the bottom of the display device 102, after which the user's gaze returns to the first window 110-1. Rather than altering and the re-altering the video and/or audio settings two times in that moment, the controller 106 may adjust the video settings after a threshold period of time. For example, the user gaze may switch from the second window 110-2 to the first window 110-1. The controller 106 may adjust the video settings responsive to the first window 110-1 aligning with the gaze region for a threshold period of time, for example three seconds. Doing so may avoid switches that occur too frequently and that may be distracting to the user 112. Moreover, frequent shifts, may overwhelm the processing resources of the computing device 100. While particular reference is made to adjusting video and audio settings associated with videoconferencing applications, the controller 106 may adjust the settings of windows 110 associated with other, non-videoconferencing applications.

In addition to adjusting the settings of the computing device 100 based on the gaze region, the controller 106 may selectively activate and de-activate the gaze tracking device 104 itself. For example, it may be the case that one of the two windows 110 utilizes a capture device or an audio device while another does not. In such an example, it may not be necessary to adjust video and/or audio settings of the second window 110-2. Accordingly, in this example, the gaze tracking device 104 may be activated responsive to metadata indicating that both the first window 110-1 and the second window 110-2 implement a stream from a capture device. When this occurs, the controller 106 may activate the gaze tracking device 104. Still in this example, the controller 106 may de-activate the gaze tracking device 104 responsive to a count of windows 110 that implement the stream falling below two. Accordingly, the activation of the gaze tracking device 104 may be triggered by metadata indicating multiple windows 110 are activated that implement a stream from the capture device.

In other examples, the gaze tracking device 104 may be continually active. That is, the gaze tracking device 104 may continually determine a gaze region and the controller 106 may continually adjust settings based on the alignment of the gaze region with particular windows 110 on the computing device 100. In yet another example, the gaze tracking device 104 may be manually activated. That is, the user 112 may activate the gaze tracking device 104 via a mechanical button or a user interface element.

Figure 2:
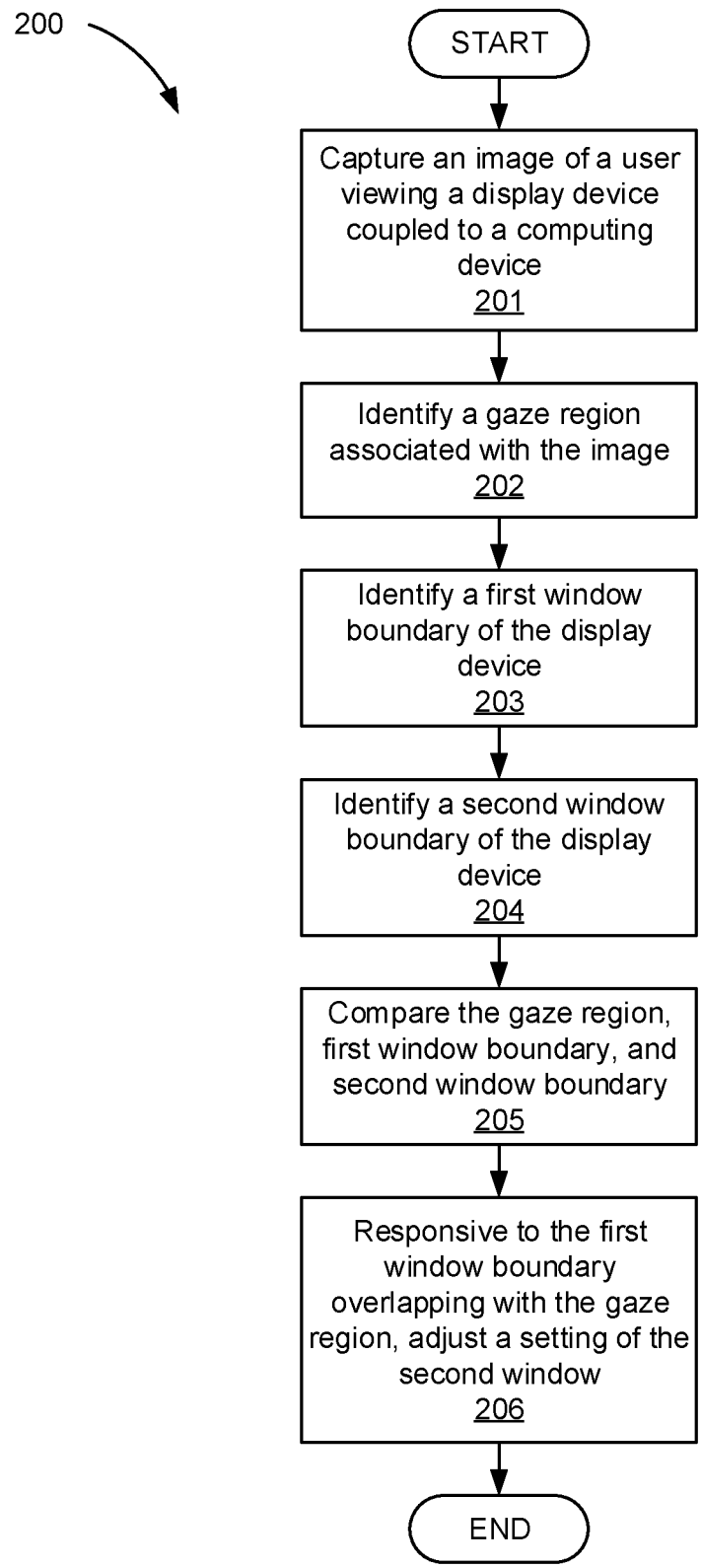
FIG. 2 is a flowchart of a method for performing gaze-based window adjustments, according to an example.

FIG. 2 is a flowchart of a method 200 for performing gaze-based window 110 adjustments, according to an example. At step 201, the method 200 includes capturing an image of a user 112 viewing a display device 102 coupled to a computing device 100. That is, as described above, a capture device such as a camera may be directed towards a user 112 to capture the user 112 viewing the display device 102.

At step 202, the method 200 includes identifying a gaze region associated with the image. As described above, the gaze tracking device 104 may determine any number of characteristics of user 112 head position including a yaw, pitch, and roll of the head of the user 112, an x-coordinate gaze point and a y-coordinate gaze point. In addition to this information, the gaze tracking device 104 may collect additional position data for the head of the user 112 including, but not limited to, a distance between the user 112 and the display device 102, a user presence in front of the display device 102, a user focus in the field of view of the capture device, and a user eye state, or a combination thereof.

At step 203, the method 200 includes identifying a first window boundary of the display device 102. In displaying the first window 110-1, the computing device 100 may generate or access metadata which is indicative of a location and a position of the first window 110-1. Such data may indicate coordinates of the boundary of the first window 110-1. Similarly at step 204, the method 200 includes identifying a second window boundary of the display device 102.

At step 205, the method 200 includes comparing the gaze region of the user 112 with the first window boundary and the second window boundary. This comparison allows the controller 106 to identify which window 110 the user 112 is focusing on. At step 206, the method 200 includes adjusting a setting of the second window 110-2 responsive to the first window boundary overlapping with the gaze region of the user 112. That is, when it is determined that the coordinates of the gaze region, i.e., the x-direction gaze point and the y-direction gaze point fall within the coordinate boundary of the first window 110-1, the controller alters the settings of the second window 110-2. This may include a variety of video-based adjustments including blurring a video stream of the user 112 in the second window 110-2, disabling a video stream of the user 112 in the second window 110-2, and/or providing a pre-recorded video loop of the user 112 in the second window 110-2. As described above, such adjustments may occur after the user 112 gaze is aligned with the first window for a threshold period of time so as to avoid the distraction that may occur when windows 110 are switched between too frequently. As described above, in addition to adjusting video settings, the controller 106 may adjust an audio setting of the second window 110-2, for example by muting the audio stream of the user 112 in the second window 110-2 that is outside the gaze region.

Figure 3:
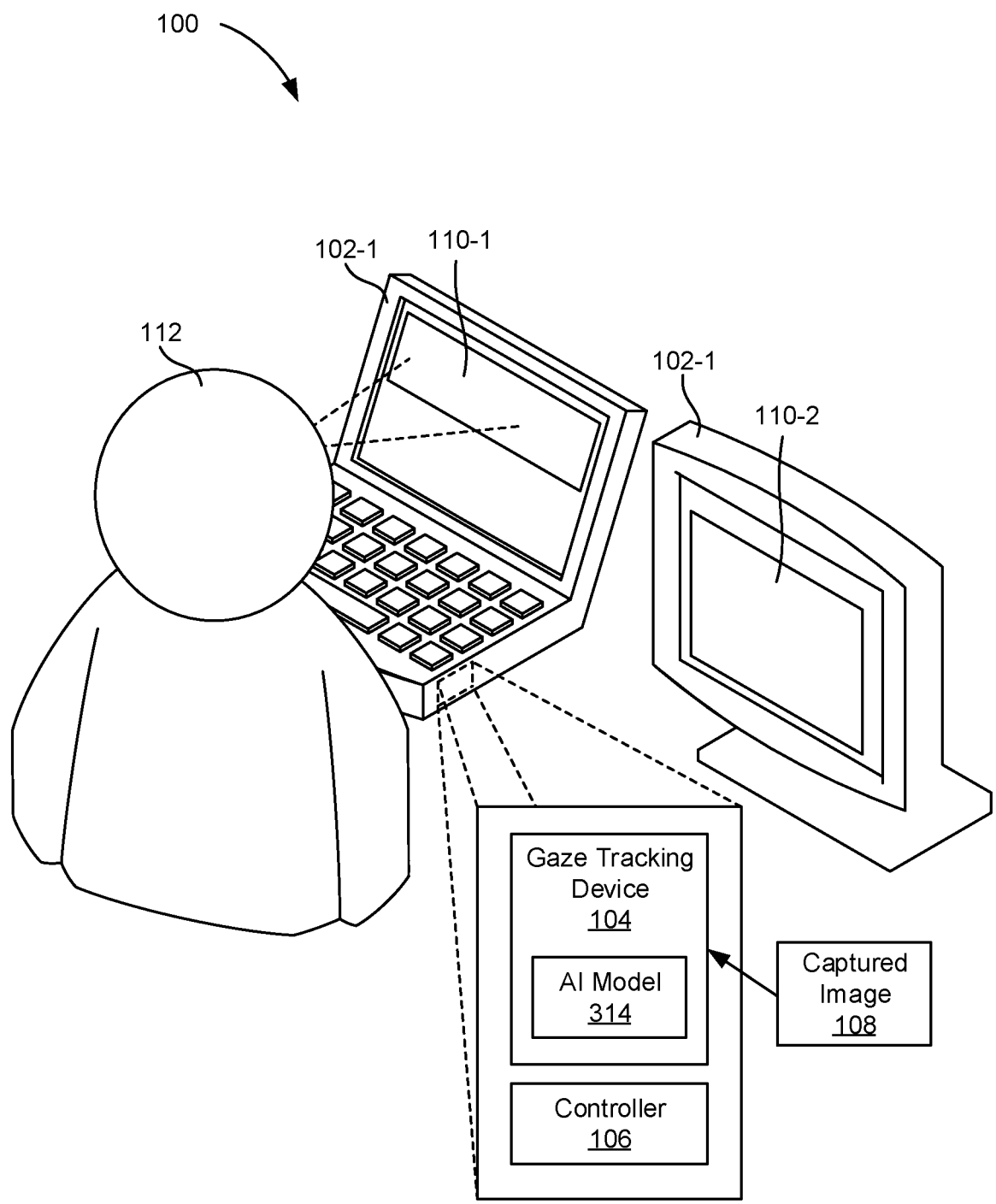
FIG. 3 is a diagram of a computing device for gaze-based window adjustments, according to an example.

FIG. 3 is a diagram of a computing device 100 for gaze-based window adjustments, according to an example. As described above, in some examples the windows 110-1, 110-2 may be displayed on the same display device 102. However, in other examples such as that depicted in FIG. 3, the second window 110-2 may be on a second display device 102-2 which is coupled to the computing device 100, whereas the first window 110-1 is displayed on a first display device 102-1.

Also as described above, in some examples the gaze tracking device 104 may be a machine-learning gaze tracking device 104 that compares the gaze region of the user 112 against a dynamic training set of data for which the gaze region of captured subjects is known. Accordingly, the gaze tracking device 104 may include an AI model 314 to assist in the determination of the gaze region from the captured image 108. In an example, the AI model 314 may include a neural network, a deep neural network, an artificial neural network, or any other model that could be trained via machine learning. Based on the AI model 314, the gaze tracking device 104 may identify which region of the computing device 100 the user 112 is looking at and transmit such information to the controller 106. Specifically, based on the AI model 314, the gaze tracking device 104 may identify, from a captured image of a user viewing a display device coupled to the computing device, a pupil position for the user. From the pupil position for the user, the gaze tracking device 104 may identify position data for a head of the user and ultimately may identify a gaze region for the user.

As described above, the controller 106 determines, a first window 110-1 on the display device 102 that is aligned with the gaze region for the user 112 and adjusts the settings of a second window 110-2 that is outside the gaze region responsive to the determination.

As described above, the settings of a particular window 110, or an application associated with the window 110, was adjusted. However, in some examples, responsive to the first window 110-1 overlapping with the gaze region, a device-wide setting of the computing device 100 may be adjusted based on metadata of the first window 110-1. For example, the first window 110-1 may be associated with a word processing application and the second window 110-2 may be associated with a gaming application. For optimized performance, it may be desirable that a high refresh rate is implemented on the display device 102 when the gaming application is the subject of user focus. However, when the word processing application is activated or the subject of attention of the user 112, the high refresh rate may be unnecessary and may overload the graphics display controller. Accordingly, responsive to an indication that the first window 110-1, i.e., associated with the word processing application, is active, the controller 106 may decrease the refresh rate for the computing device 100. By comparison, responsive to an indication that the second window 110-2, i.e., associated with the gaming application, is active, the controller 106 may increase the refresh rate. While particular reference is made to one such setting that is adjusted based on a user 112 focusing on a particular window, any variety of settings may be similarly adjusted based on which window 110 the user 112 is looking at. Such adjustments of settings based on metadata associated with the active window 110 may result in improved and more efficient utilization of the resources of the computing device 100.

Figure 4:
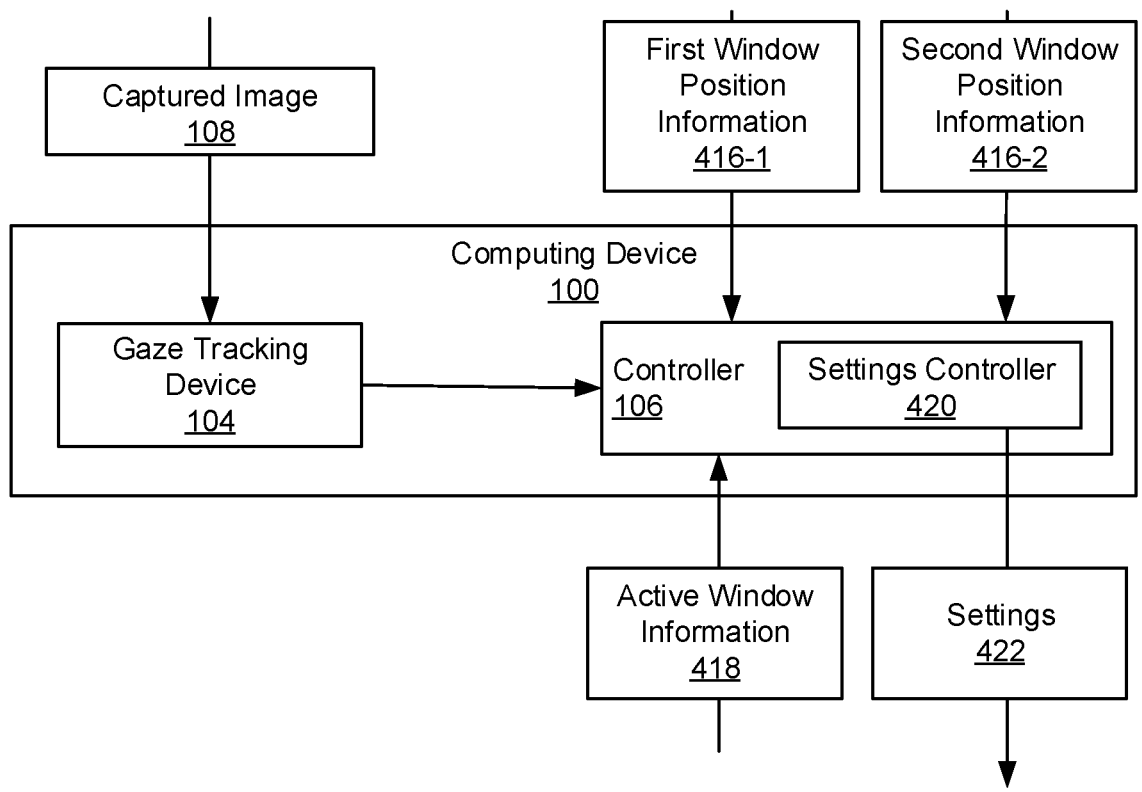
FIG. 4 is a diagram of a computing device for gaze-based window adjustments, according to an example.

FIG. 4 is a diagram of a computing device 100 for gaze-based window 110 adjustments, according to an example. As described above, the gaze tracking device 104 may receive a captured image 108 or sequence of captured images 108 of a user 112 looking at a display device 102 coupled to the computing device 100. The gaze tracking device 104 determines where on the display device 102 the user 112 is looking.

Based on this and additional information, the controller 106 determines which window 110 the user 112 is looking at and adjusts the settings of the windows 110 and/or computing device 100 accordingly.

In an example, the additional information or input received at the controller 106 includes first window position information 416-1 and second window position information 416-2. That is, applications, or the computing device 100 itself, may include metadata indicating a position and size of windows 110 on the display device 102. This window position information 416 may be passed to the controller 106. With the window boundaries identified and the gaze region of the user 112 identified, the controller 106 can determine which window 110 the user is looking at and a settings controller 420 of the controller 106 may pass the settings 422 for the windows 110 and/or computing device 100. In one example, the settings controller 420 is an application programming interface associated with video, audio, or other aspects of the windows 110 and/or computing device 100.

As described above, in some examples, the gaze tracking device 104 is activated based on whether or not the multiple windows 110 are active and whether or not they rely on video and audio components. Accordingly, the controller 106 may receive active window information 418. This information may indicate 1) whether a second window 110-2 is active and 2) whether the second window 110-2 relies on audio and/or video stream. As described, this example pertains to a scenario where the gaze tracking device 104 is selectively activated. In other examples, the gaze tracking device 104 may be continually active or manually activated based on user 112 input.

Figure 5:
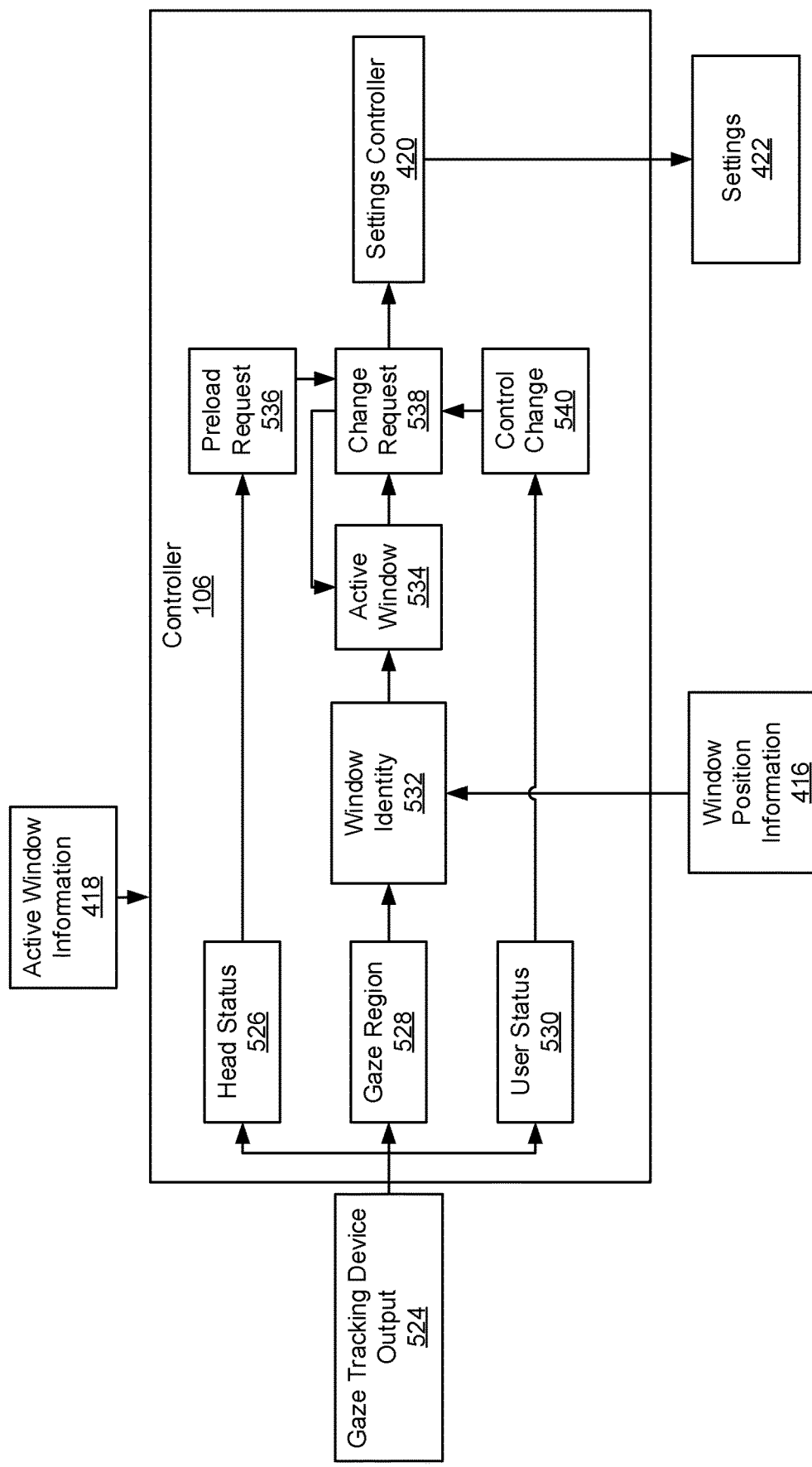
FIG. 5 is a diagram of a controller for gaze-based window adjustments, according to an example.

FIG. 5 is a diagram of a controller 106 for gaze-based window 110 adjustments, according to an example. As described above, the controller 106 receives as input 1) a gaze tracking device output 524, which is indicative of a gaze region 528 of the user 112, 2) window activation information 418 which is indicative of whether a second window 110-2 that implements audio and or video output is active, and 3) window position information 416 which is indicative of a location and size of different windows 110 that may be active. From this information, the controller 106 may execute a variety of operations.

For example, from the gaze tracking device output 524, the controller may determine a gaze region 528, which may include an x-coordinate gaze point and a y-coordinate gaze point. From this gaze region 528 information and the window position information 416, the controller may determine a window identity 532 of the window 110 that the user 112 is looking at. This may be performed as described above.

The controller 106 may determine the active window identity 534, that is the window 110 with video and audio settings activated. Based on this determination, the controller 106 may submit a change request 538 to the settings controller 420. The change request 538 provides information to the settings controller 420 to establish the settings 422 such that the video and/or audio settings of the inactive window are disabled and/or muted. Note that the change request 538 and determination of the active window identity 534 are iterative and continuous to determine which of the windows 110 should be activated/deactivated.

In addition to this information, additional gaze tracking device output 524 information may be implemented in other ways. For example, the gaze tracking device 104 may output head status 526 information which may include the yaw, pitch, and roll of the head of the user 112. Based on this information, the controller 106 may generate a window preload request 536. For example, a user, administrator, or the computing device 100 may set a threshold gaze time of 500 milliseconds, which threshold gaze time refers to an amount of time for a gaze region to be towards a window 110 before switching settings. However, the computing device 100 may take 800 milliseconds to process the image data to identify a changed gaze region and adjust corresponding settings. Accordingly, the head status 526 information may provide a prediction that a gaze change is forthcoming such that this lag may be reduced. That is, a user 112 head may be tilted to one side indicative that although the user 112 is looking at the second window 110-2, they are about to switch to look at the first window 110-1. This may indicate a forthcoming switching of the user gaze from the second window 110-2 to the first window 110-1. In this example, the controller 106 may pre-load the window 110, i.e., by generating a command to switch, but may wait to switch until the gaze region 528 information confirms the change in gaze.

As described, the gaze tracking device 104 may collect additional position data for the head of the user 112. In some examples, this additional position data may be user status 530 data and may include a distance between the user 112 and the display device 102, a user presence in front of the display device 102, a user focus in the field of view of the capture device, and a user eye state, or a combination thereof. Such information may be used to alter any adjustment to the setting 422. For example, the user status 530 information may be used to prevent a switch. For example, gaze point 528 information may dictate that a switch should be made because the user is not looking at a first window 110-1. However, it may be the case that the users 112 eyes are closed while they are still paying attention. Accordingly in this example, the user status 530 information may be used to prevent a setting change that otherwise would have occurred.

As another example, the user status 530 information may indicate that the user 112 is sitting beyond a threshold distance away from the computing device 100, this threshold distance being a distance beyond which gaze tracking is unreliable. In this example, the user status 530 information may prevent a gaze-based switch which may have otherwise occurred. Accordingly, in this example, the user status 530 may authorize or prevent a change request 538 based on the additional position data.

Figure 6:
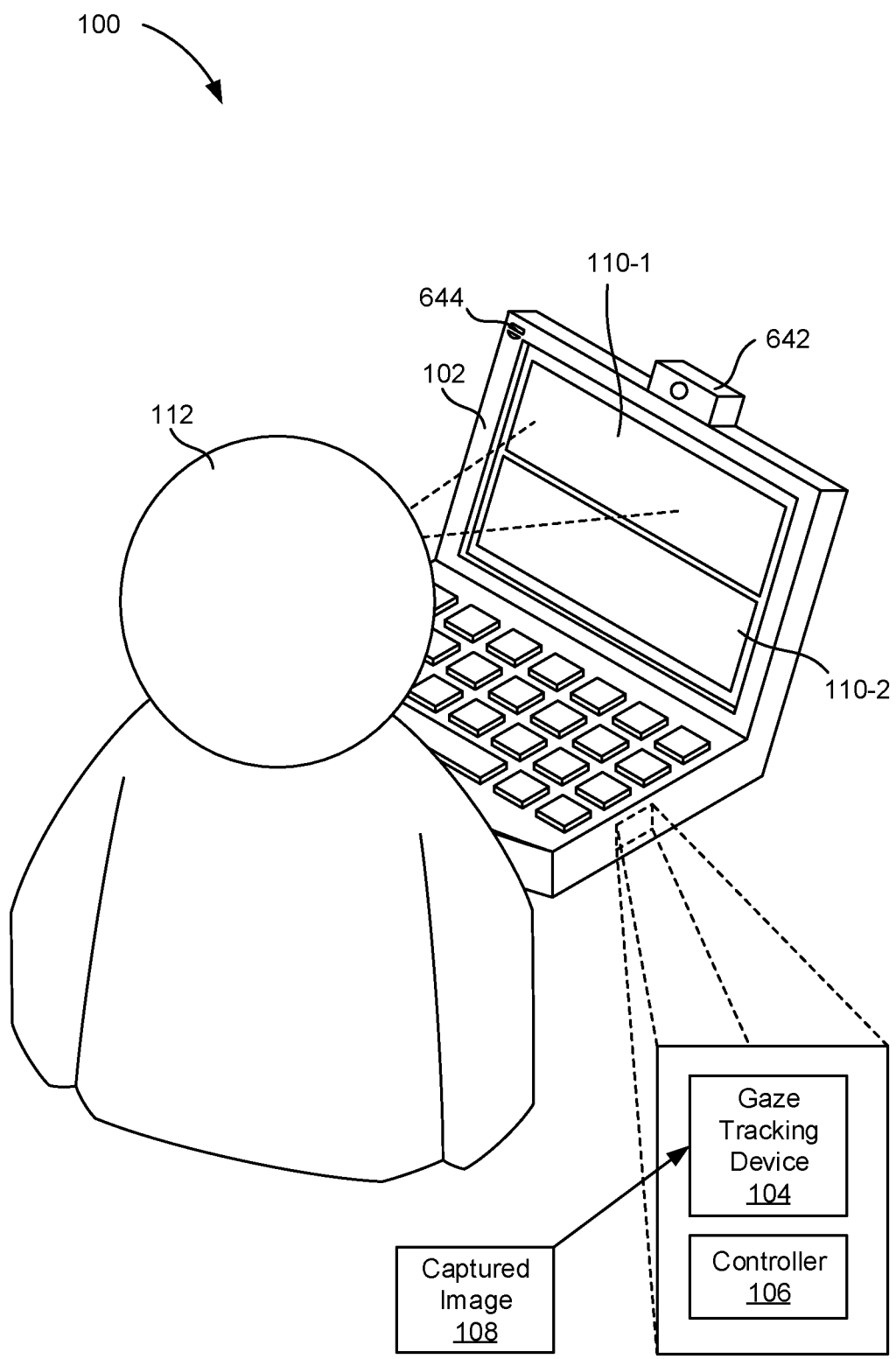
FIG. 6 is a diagram of a computing device for gaze-based window adjustments, according to an example.

FIG. 6 is a diagram of a computing device 100 for gaze-based window adjustments, according to an example. In addition to those components previously described, the computing device 100 of FIG. 6 includes additional components. For example, the computing device 100 may include the capture device 642 to capture the image of the user 112 viewing the display device 102. As described above, the capture device 642 may be a camera that is integrated with, or attached to, the display device 102 and is directed to face the user 112.

The computing device 100 may also include a microphone 644. In this example, responsive to a determination that the first window 110-1 is aligned with the gaze region, the controller 106 may disable a microphone output in a stream of the second window 110-2. This microphone 644 may capture audio of the user 112 as they are engaging in a videoconference in the first window 110-1, or audio from the speakers of the computing device 100, which audio from the speakers may be from other participants in the videoconference in the first window 110-1. In either case, it may be desirable to prevent this audio output from being transmitted as an audio stream to the second window 110-2, for privacy and/or security reasons as well as to prevent audio interference. Accordingly, the controller 106 may disable the microphone 644 for use by the application of the second window 110-2.

Figure 7:
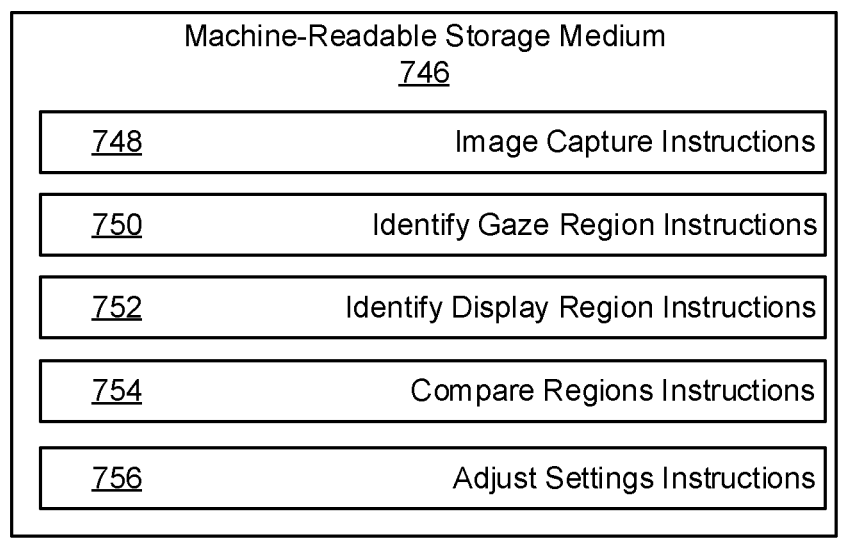
FIG. 7 depicts a non-transitory machine-readable storage medium for gaze-based window adjustments, according to an example.

FIG. 7 depicts a non-transitory machine-readable storage medium 746 for gaze-based window adjustments, according to an example. As used in the specification, the term "non-transitory" does not encompass transitory propagating signals. To achieve its desired functionality, a computing device 100 includes various hardware components. Specifically, a computing device 100 includes a processor and a machine-readable storage medium 746. The machine-readable storage medium 746 is communicatively coupled to the processor. The machine-readable storage medium 746 includes a number of instructions 748, 750, 752, 754, 756 for performing a designated function. The machine-readable storage medium 746 causes the processor to execute the designated function of the instructions 748, 750, 752, 754, 756. The machine-readable storage medium 746 can store data, programs, instructions, or any other machine-readable data that can be utilized to operate the computing device 100. Machine-readable storage medium 746 can store computer readable instructions that the processor of the computing device 100 can process, or execute. The machine-readable storage medium 746 can be an electronic, magnetic, optical, or other physical storage device that contains or stores executable instructions. Machine-readable storage medium 746 may be, for example, Random Access Memory (RAM), an Electrically Erasable Programmable Read-Only Memory (EEPROM), a storage device, an optical disc, etc. The machine-readable storage medium 746 may be a non-transitory machine-readable storage medium 746.

Referring to FIG. 7, image capture instructions 748, when executed by the processor, cause the processor to, capture an image of a user 112 viewing a display device 102 coupled to a computing device 100. Identify gaze region instructions 750, when executed by the processor, may cause the processor to identify a gaze region associated with the image. The gaze region indicates a location on the display device 102 where the user 112 is looking. Identify display region instructions 752, when executed by the processor, may cause the processor to, identify a first window boundary of the display device 102 and identify a second window boundary of the display device 102. Compare regions instructions 754, when executed by the processor, may cause the processor to compare the gaze region, first window boundary, and second window boundary to identify which of the first window and the second window overlap with the gaze region. Adjust settings instructions 756, when executed by the processor, may cause the processor to adjust a setting of the second window 110-2, responsive to the first window boundary overlapping with the gaze region.

What is claimed is:

1. A computing device, comprising:
  a gaze tracking device to identify, from a captured image, a gaze region for a user viewing a display device coupled to the computing device, the gaze region indicating a location on the display device where the user is looking; and
  a controller to:
    determine a first window on the display device that is aligned with the gaze region; and
    based on a determination that the first window is aligned with the gaze region, adjust a video setting of a second window that is outside the gaze region,
    wherein the gaze tracking device is activated responsive to metadata indicating that the first window and the second window implement a video stream from a capture device.

2. The computing device of claim 1, wherein the controller is to adjust the video setting of the second window responsive to the first window aligning with the gaze region for a threshold period of time.

3. The computing device of claim 1, wherein the second window is on the display device alongside the first window.

4. The computing device of claim 1, wherein the second window is on a second display device coupled to the computing device.

5. The computing device of claim 1, wherein the controller is to blur a video stream of the user in the second window responsive to a determination that the first window is aligned with the gaze region.

6. The computing device of claim 1, wherein the controller is to disable a video stream of the user in the second window responsive to a determination that the first window is aligned with the gaze region.

7. The computing device of claim 1, wherein the controller is to loop a pre-recorded video of the user in the second window responsive to a determination that the first window is aligned with the gaze region.

8. The computing device of claim 1: further comprising a microphone; and wherein responsive to a determination that the first window is aligned with the gaze region, the controller is to disable a microphone output in a stream of the second window.

9. The computing device of claim 1, further comprising a capture device to capture an image of the user viewing the display device.

10. The computing device of claim 9, wherein the gaze tracking device is a machine-learning gaze tracking device.

11. The computing device of claim 1, wherein the controller is to, based on a determination that the first window is aligned with the gaze region, adjust an audio setting of the second window.

12. A computing device, comprising:
  a gaze tracking device comprising an artificial intelligence (AI) model to:
    identify, from a captured image of a user viewing a display device coupled to the computing device, a pupil position for the user;
    identify from the pupil position for the user, position data for a head of the user; and
    identify from the position data for the head of the user, a gaze region for the user; and
  a controller to:
    identify a first window of the display device;
    determine whether the first window on the display device is aligned with the gaze region for the user; and
    responsive to a determination that the first window is aligned with the gaze region, adjust a setting of a second window that is outside the gaze region,
    wherein the gaze tracking device is activated responsive to metadata indicating that the first window and the second window implement a video stream from a capture device.

13. The computing device of claim 12, wherein the controller is to de-activate the gaze tracking device responsive to a count of windows that implement the video stream falling below two.

14. The computing device of claim 12, wherein the gaze tracking device is to determine a yaw, pitch, and roll of the head of the user from the captured image.

15. The computing device of claim 14, wherein the controller is to pre-load the setting based on a determined yaw, pitch, and roll of the head of the user.

16. The computing device of claim 12, wherein:
  the gaze tracking device is to collect additional position data for the head of the user; and
  the controller is to alter an adjustment to the setting based on the additional position data.

17. The computing device of claim 16, wherein the additional position data comprises:
  a distance between the user and the display device;
  a user presence in front of the display device;
  a user focus in a field of view of a capture device;
  a user eye state; or
  a combination thereof.

18. A non-transitory machine-readable storage medium encoded with instructions executable by a processor of a computing device to, when executed by the processor, cause the processor to:
  capture an image of a user viewing a display device coupled to the computing device;
  responsive to metadata indicating that a first window and a second window implement a video stream from a capture device, identify a gaze region associated with the image, the gaze region indicating a location on the display device where the user is looking;

identify a first window boundary of the display device;
identify a second window boundary of the display device;
compare the gaze region, first window boundary, and second window boundary to identify which of the first window and second window overlaps with the gaze region;
responsive to the first window boundary overlapping with the gaze region, adjust a setting of a second window.

19. The non-transitory machine-readable storage medium of claim 18, further comprising instructions executable by a processor of the computing device to, when executed by the processor, cause the processor to, responsive to the first window overlapping with the gaze region, adjust a device-wide setting of the computing device based on metadata associated with a first window.

* * * * *